Feb. 4, 1958 — W. E. HAMPTON — 2,822,063
SELF ADJUSTING CHOCK
Filed Aug. 11, 1953
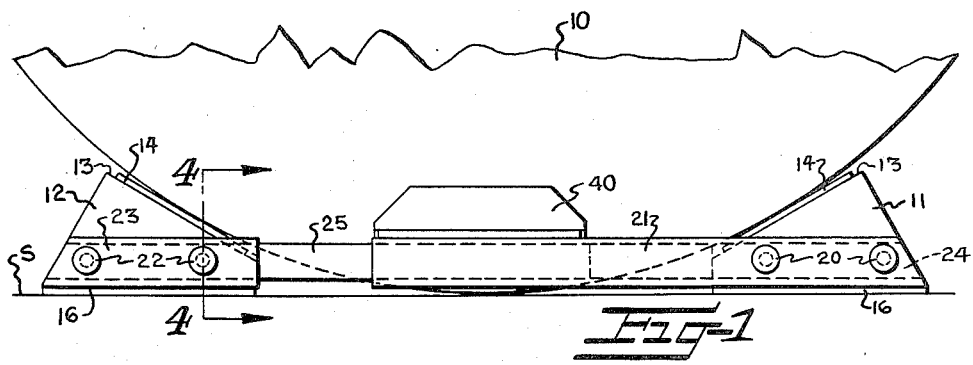
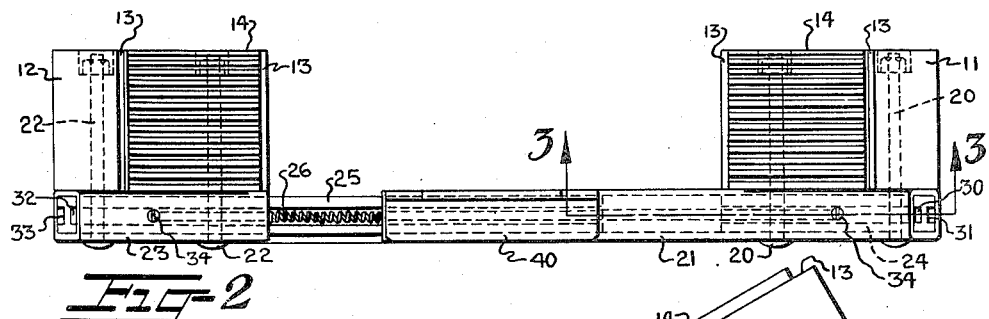
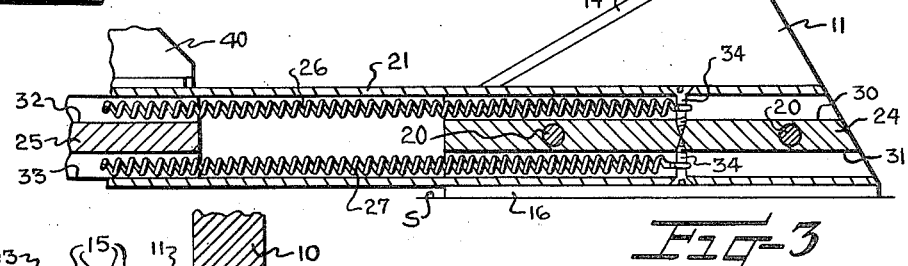
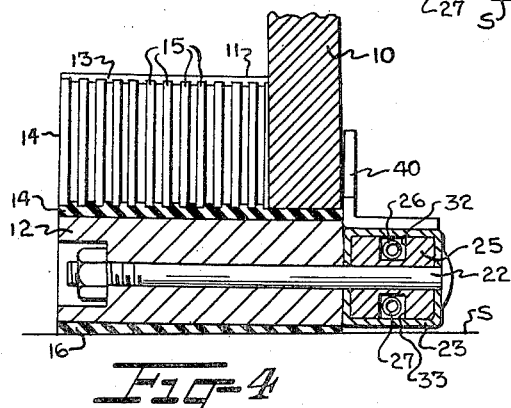
WILLIAM E. HAMPTON,
INVENTOR.
BY Eaton + Bell
ATTORNEYS United States Patent Office 2,822,063
Patented Feb. 4, 1958

2,822,063

SELF ADJUSTING CHOCK

William E. Hampton, Charlotte, N. C., assignor to United Equipment & Service Inc., Charlotte, N. C., a corporation of Maryland Application August 11, 1953, Serial No. 373,555

2 Claims. (Cl. 188—32)

This invention relates to an improved chock for cylindrical or circular objects such as wire or hose reels, drums, and other substantially circular transportable articles.

It is the primary object of this invention to provide a self adjusting chock comprising a pair of telescopically interconnected chock blocks and resilient means normally urging the chock blocks toward each other to a predetermined spaced relationship and wherein the lower surface of each of the chock blocks has a resilient covering thereon so the chock blocks have a high coefficient of friction relative to the surface upon which the blocks may be resting and, also, wherein the upper surfaces of the chock blocks are inwardly inclined relative to each other and are also provided with a resilient covering thereon.

It is another object of this invention to provide a self adjusting chock of the type described wherein the angle of inclination of each chock block is such that the weight of a circular object in engagement therewith causes increased friction between the chock blocks and the surfaces upon which the chock blocks are resting. The angle of inclination is also such as to cause increased friction between the cylindrical object and the blocks upon movement of the cylindrical object to thus prevent the cylindrical object from riding over the blocks.

The resilient means urging the chock blocks together is such as to enable the operator to force the chock blocks apart from each other sufficiently to permit the lower peripheral portion of a cylindrical object to be placed therebetween and whereupon the resilient means causes the chock blocks to move toward each other so the upper inclined surfaces thereof tightly engage the corresponding surfaces of the article to be restrained from movement thereby.

It is another object of this invention to provide a chock of the character described wherein the upper inclined surface of each chock block has a resilient covering thereon which is serrated or provided with spaced ridges extending in tangential relation to the circular object to thereby prevent lengthwise movement of the cylindrical or circular object relative to the chock blocks.

It is still another object of this invention to provide an improved chock which is simple in construction, is well adapted for economical manufacture and which may readily adjust itself to accommodate circular or cylindrical articles of varying diameter.

The chock is particularly adapted to be used in transporting heavy and bulky cylindrical objects by truck or flat car where heretofore it has been necessary to provide a more or less permanent bracing arrangement such as nailing bracing blocks and the like to the floor of the truck or flat car with resulting damage thereto. The self adjusting chock of this invention can be used over and over again without damage to the supporting surface and without the necessity of additional bracing or chocking means.

Some of the objects of the invention having been stated, other objects will appear as the description proceeds, when taken in connection with the accompanying drawings in which—

Figure 1 is an elevation of the improved chock showing a portion of a cylindrical object restrained from movement by said chock;

Figure 2 is a top plan view of the chock shown in Figure 1, omitting the cylindrical object or article, but showing the chock blocks spaced from each other a greater distance than would normally be the case in the absence of a cylindrical object being disposed therebetween;

Figure 3 is an enlarged fragmentary vertical sectional view taken along line 3—3 in Figure 2;

Figure 4 is an enlarged transverse vertical sectional view taken along line 4—4 in Figure 1.

Referring more specifically to the drawings, the numeral 10 indicates a circular or cylindrical object such as a reel, drum or wheel which rests upon a surface S which may represent the floor of a transporting device, such as a truck, railroad car, or the like. The improved chock comprises a pair of spaced telescopically interconnected chock blocks 11 and 12 which are provided with inclined inwardly converging upper surfaces 13. The surface 13 of each chock block 11 and 12 has a frictional or resilient covering, plate or pad 14 adhesively or otherwise secured thereto, the upper surface of which is preferably serrated longitudinally thereof to form closely spaced ridges 15 thereon (Figure 4).

The lower surface of each chock block 11 and 12 also has a frictional or resilient covering, plate or pad 16 adhesively or otherwise secured thereto. The chock blocks 11 and 12 are preferably made from wood or other lightweight material and the resilient pads 14 and 16 are preferably made from oil resistant rubber or synthetic rubber, such as neoprene, so as to provide the upper and lower surfaces of the blocks 11 and 12 with a very high coefficient of friction. The block 11 is suitably secured as by bolts 20 to one side of an elongated tube 21, which is preferably rectangular in cross section and is substantially longer than the block 11. The chock block 12 is also suitably secured, as by bolts 22, to one side of a relatively short tube 23 which tube is preferably substantially the same length as the block 12.

Disposed in one end of the tube 21 is an anchor block or bar 24 which is preferably substantially the same length as the block 11 and is fixed in the tube 21 by the bolts 20 which serve to secure the block 11 to the tube 21. One end of a guide bar 25 is also suitably secured in the relatively short tube 23, as by the bolts 22, which also serve to secure the block 12 to the tube 23. The guide bar 25 has longitudinal sliding or telescopic movement in the tube 21.

The chock blocks 11 and 12 are urged toward each other by suitable tension springs 26 and 27, maintaining the chock blocks in firm contact with the cylindrical or circular object 10. The bars 24 and 25 are provided with respective longitudinally extending upper and lower grooves 30 and 31 and 32 and 33. Opposite end portions of the upper tension spring 26 are disposed in the alined grooves 30 and 32 and opposite end portions of the lower tension spring 27 are disposed in the alined lower grooves 31 and 33. The opposite ends of the springs 26 and 27 are connected to suitable spring anchors in the form of screws 34 which penetrate the respective tubes 21 and 22, extend through the corresponding grooves 30, 31, 32 and 33 and are embedded in the medial portions of the respective blocks or bars 24 and 25.

Suitably secured to the upper surface of the tube 21, adjacent the inner or free end thereof, is an angle bar 40 which serves as an end restraining element and positioning element to assist the operator in positioning the improved chock adjacent one end of the cylindrical or circular article 10 and which also prevents the article from moving laterally outwardly relative to the chock blocks 11 and 12.

It will be observed in Figure 4 that, in the instance of the article 10 being a reel, such as reel of wire, cable, conduit or the like, the downward pressure caused by the weight of the reel or the article 10 causes the resilient coverings 14 and 16 to be compressed adjacent the respective tubes 21 and 23 thereby effecting a high amount of friction between the article 10, the blocks 11 and 12, and the surface S. The upper surfaces 13 of the blocks 11 and 12 are formed at a relatively shallow angle of, say, thirty degrees relative to the surface S, which angle, due to the resilient covering 14 on each of the surfaces 13, is such that the circular or cylindrical object 10 will not ride over either of the blocks 11 or 12 due to the fact that any such riding motion increases the friction between the bottom resilient plate 16 and the surface S such that the blocks 11 and 12 cannot move under the article 10 because the usual forces tending to cause motion to the article 10 are always exceeded by the frictional resistance of the resilient plates 16 against the surface S.

The angle of incline of the blocks 11 and 12 may be varied for particular use and the desired angle of the face of these blocks in relation to the floor plane is such that the sine of one half the angle is less than the coefficient of friction of the facing material with any other material with which it will come in contact in normal use. When this condition exists, the blocks cannot move from under the chocked object because the force tending to cause motion is always exceeded by the frictional holding ability of the blocks.

It is thus seen that I have provided an improved chock which is simply and economically constructed, which obviates the necessity of providing fastening means for securing the article 10 to the chock blocks 11 and 12 or for securing the chock to the floor or surface S and wherein the chock blocks 11 and 12 may easily be positioned astride the lower portion of the cylindrical or circular article 10 and, also, wherein movement of the chocked article is then impossible, except in the case of very violent movement or sudden stoppage of the truck or other transporting means, such as a collision. Such violent movement is rarely experienced.

In the drawings and specification there has been set forth a preferred embodiment of the invention and, although specific terms are employed, they are used in a generic and descriptive sense only, and not for purposes of limitation, the scope of the invention being defined in the claims.

I claim:

1. In a device for chocking a cylindrical object, first and second chock blocks having inclined downwardly converging upper surfaces thereon, a first tube having one end thereof fixed to one side of the first block, a second tube having one end fixed to one side of the second block, a guide bar fixedly mounted within the second tube and having a free end extending outwardly through the other end of the second tube, the free end of said guide bar being telescopically received within the other end of said first tube for longitudinal movement with respect thereto, an anchor bar fixedly mounted within said one end of the first tube and having a free end, the upper and lower surfaces of said guide bar each having a longitudinally extending groove therein, the upper and lower surfaces of said anchor bar each having a longitudinally extending groove therein in respective alinement with the grooves in said guide bar, a first tension spring having its opposite end portions disposed in the grooves formed in the upper surfaces of said guide bar and said anchor bar, a second tension spring having its opposite end portions disposed in the grooves formed in the lower surfaces of said guide bar and said anchor bar, means anchoring corresponding ends of the springs adjacent the distal ends of the guide bar and the anchor bar whereby the tension springs may pull the first and second chock blocks toward each other, the other ends of the first and second tubes thereby being drawn toward each other into abutting relationship to limit the movement of the first and second chock blocks toward each other and whereby said chock blocks may be moved apart from each other against the action of the springs for positioning the same astride the lower portion of the cylindrical object.

2. In a chocking device as defined in claim 1, wherein said first tube is provided adjacent its other end with an angle bar on its upper surface, said angle bar having a vertically extending upright flange serving as a positioning element whereby the chocking device may be placed adjacent one end of the cylindrical object with the upright flange of said angle bar in abutment with the end of the cylindrical object, said upright flange in addition preventing the cylindrical object from moving laterally outwardly relative to the first and second chock blocks.

References Cited in the file of this patent

UNITED STATES PATENTS

| | | |
|---|---|---|
| 1,893,580 | Colley | Jan. 10, 1933 |
| 2,011,469 | Brueggmann | Aug. 13, 1935 |
| 2,442,023 | Schwarzhoff | May 25, 1948 |
| 2,475,111 | Ridland | July 5, 1949 |

FOREIGN PATENTS

| | | |
|---|---|---|
| 675,784 | France | Nov. 8, 1929 |